United States Patent [19]

McWhorter

[11] 4,085,628

[45] Apr. 25, 1978

[54] INTRA-ARTICULATE RECIPROCATING ENGINE SYSTEM

[76] Inventor: Edward Milton McWhorter, 6931 Greenbrook Cir., Citrus Heights, Calif. 95610

[21] Appl. No.: 693,682

[22] Filed: Jun. 7, 1976

[51] Int. Cl.² .................... G05G 1/00; F02B 75/32
[52] U.S. Cl. .................... 74/579 E; 74/581; 74/602; 123/197 A; 123/197 AR; 123/197 AC
[58] Field of Search ....... 123/197 R, 197 A, 197 AR, 123/197 AC; 74/579 E, 581, 602, 603

[56] References Cited

U.S. PATENT DOCUMENTS

| 1,384,343 | 7/1921 | Powell | 123/197 R |
| 1,574,573 | 2/1926 | Hele | 123/197 AC |
| 3,176,671 | 4/1965 | Stinebaugh | 123/197 R |
| 3,429,623 | 2/1969 | Dunston et al. | 74/579 E X |
| 3,808,912 | 5/1974 | Voorhees et al. | 74/604 |

Primary Examiner—Carlton R. Croyle
Assistant Examiner—R. E. Gluck

[57] ABSTRACT

The invention is a reciprocating mechanism for piston driven internal and external combustion engines. The design presented consists of an intra-articulate connecting rod system operating in conjunction with a compound crankshaft. The advantage of this system over the ordinary reciprocating mechanism employed in other engine systems, is seen to be in the reduction of piston speed during the initial expansion process thus allowing higher combustion pressures to develope at more effective crank angles past the top neutral center position of shaft rotation.

2 Claims, 5 Drawing Figures

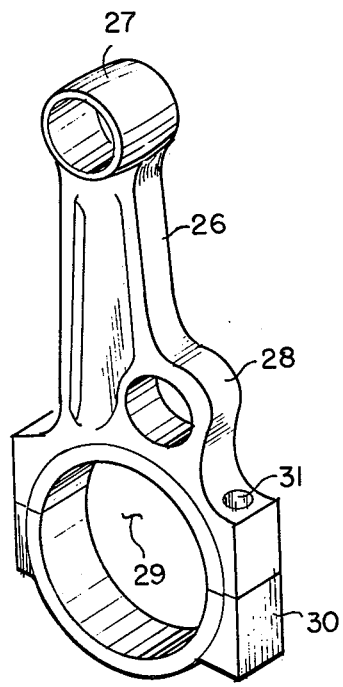
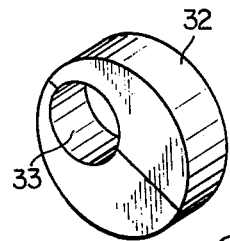
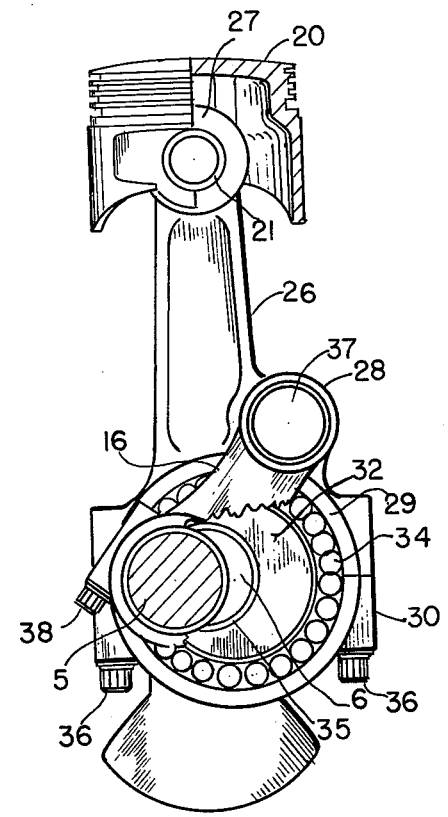

INTRA-ARTICULATE RECIPROCATING ENGINE SYSTEM

CROSS REFERENCE

This application is similar to my copending U.S. Pat. Application Serial No. 693,887 "Intra-Articulated Connecting Rod for Small Engines," filed on June 7, 1976.

BACKGROUND OF THE INVENTION

1. Field of the Invention

The invention is classified as an "Advanced reciprocating piston driven engine." This field of classification refers to any engine system in which movement of the piston is not a simple function of the harmonic motion induced by rotation of the crankpin.

2. Description of Prior Art

In the conventional piston driven engine system the reciprocating mechanism is described in classical terms as a four-bar linkage and sliding member. The invention presented consists of two four-bar linkages operating in conjunction with a sliding member.

Pressure forces developed at the piston face are transmitted to the crankpin through a central connecting rod which transfer the load to two lateral connecting rods which in turn transmit the load to the end portions of the crankpin at the point of attachment to the crank arms. The central connecting rod is attached to the center portion of the crankpin, the axial alignment of which is displaced from the longitudinal axis of the end sections of the crankpin which carry the two lateral connecting rods. This is therefore seen to be a compound crank in which the rate of change in angularity of the two lateral connecting rods, during shaft rotation, is different from that of the central connecting rod when measured relative to the axial center of the cylinder bore.

The advantage of the invention over that of the conventional reciprocating engine is the ability to control piston speed in a manner which is more consistent with the particular engine application. When rotation of the crankshaft is in the clockwise direction, the piston speed during the initial downward expansion stroke is decreased allowing more effective crank angles to develope at the essentially higher cylinder pressures. The higher cylinder pressures produced at the more effective crank angles result in a correspondingly more powerful engine. The slower piston speed, in conjunction with the shorter piston stroke, decrease the amount of cylinder wear resulting in a correspondingly longer operational life of the engine system.

There are also certain advantages to be gained in operating the system in a counter clockwise rotation of the crankshaft. These are seen to be in somewhat the better mechanical advantage at the initial expansion.

SUMMARY OF THE INVENTION

It is the primary object of this invention to provide, in a manner hereinafter setforth a means of improving the effeciency of reciprocating piston driven engines by articulation of the central connecting rod with two lateral connecting rods which operate in conjunction with a compound crank to produce lower piston speeds.

It is another object of the invention to provide a reciprocating motion in engines of the character described which increase the piston stroke and thus improve the induction of air or air-fuel mixtures for more efficient operation at rarified altitudes.

It is yet another object of the invention to produce a reciprocating motion which will result in a longer operating life for engines which operate on a near continuous duty cycle.

All of the foregoing and still further objects and advantages of the invention will become apparent from the study of the drawings and specification presented.

BRIEF DESCRIPTION OF THE DRAWINGS

There are presented as part of the specification, drawings of the reciprocating components of the engine system presented.

FIG. 2 is a perspective view of the central connecting rod.

FIG. 3 is a perspective view of an eccentric which operates in conjunction with the central connecting rod shown in FIG. 2.

FIG. 5 is an assembly drawing of the engine system.

DESCRIPTION OF THE PREFERRED EMBODIMENTS

Figure 1:
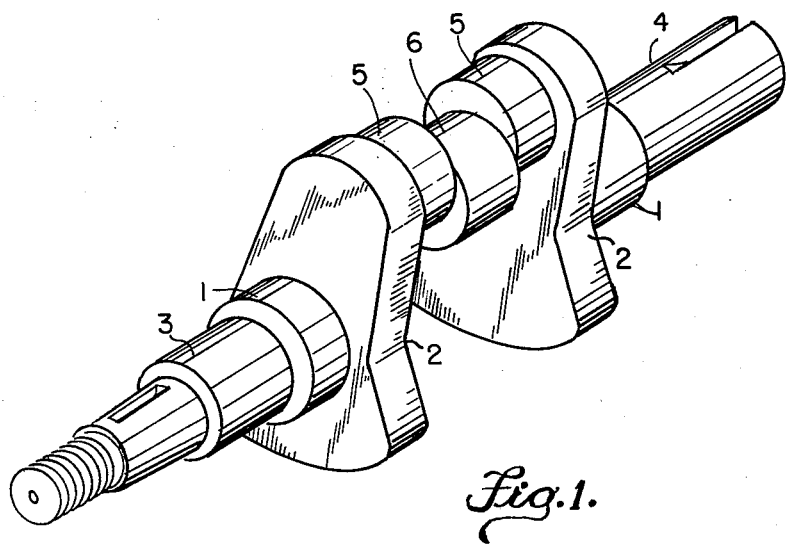
FIG. 1 is a perspective view of the compound crankshaft.

Referring now to the drawings in detail and to FIG. 1 thereof in particular. FIG. 1 is a crankshaft presented as a single throw system for clarity. The invention also applies to multiple throw crankshafts. Elements comprising the crankshaft are mainshafts 1, crank arm 2 and counterweights and forward auxilary shafting 3 for the attachment of a pully or fan system, a drive shaft 4 for mounting a flywheel and for power take off, and the crankpin composed of two parts consisting of two lateral crankpins 5 and a central crankpin 6 whose longitudinal axis is parallel with lateral crankpins 5 but located on a different axial centerline. The relative position of lateral crankpins 5 to central crankpin 6 is a matter of engine design which is dictated by the operating environment and general performance requirements. Because of the difference in axial alignment of lateral crankpins 5 and central crankpin 6 the crank shaft in FIG. 1 is termed a "compound crankshaft."

Figure 4:
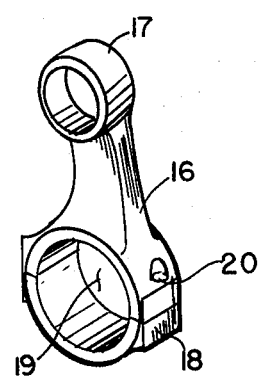
FIG. 4 is a perspective view of one of the pair of lateral connecting rods used in articulation with the central connecting rod.

FIG. 4 is a lateral connecting rod 16. Each crank throw contains two such lateral connecting rods. A journal 17 is located at the top of each lateral connecting rod 16 and are positioned on each side of journal 28 of central connecting rod 26 which is presented as FIG. 6. The lower portion contains a bearing cap 18 which allows journal 19 to be mounted on lateral crankpins 5 by bolting through holes 20.

Turning now to FIG. 6. A journal 27 is located at the top of single piece connecting rod 26. A second journal 28 is shown located below journal 27 and to one side of the longitudinal axis of single piece connecting rod 26. Those skilled in the art will recognize the fact that journal 28 could be located on the said longitudinal axis or on the opposite side of said longitudinal axis depending on the degree and type of motion to be imparted to the piston. Below journal 28 is a large journal 29 having a bearing cap 30 which allows large journal 29 to be mounted on a bearing by bolting through holes 31 located on each side of large journal 29.

Looking now at FIG. 3 which is a perspective view of an eccentric 32 constructed in this instance in two parts for mounting eccentric journal 33 upon the central crank 6. Eccentric 32 is necessary to allow for the proper movement in the kinematic chain otherwise the linkage becomes a rigid three-bar system which is of course inoperative.

Turning now to FIG. 5 which is an assembly drawing of the modification. Piston 20 is now shown pivotally mounted in journal 27 by wrist pin 21. Eccentric 32 is shown mounted within the large journal 29 with an intervening roller bearing 34 separating the said eccentric and said large journal. Eccentric journal 33 is mounted on central crankpin 6 with an intervening sleeve bearing 35 shown. The whole assembly is held in place by bolting bearing cap 30 to connecting rod 26 using bolts 36. Lateral connecting rods 16 are pivotally mounted in journal 28 by gudgen pin 37 and rotatively to the lateral crankpins 5 by bolts 38.

What is claimed is:

1. A crankshaft comprising a plurality of longitudinally aligned and longitudinally spaced mainshafts having arms fixed on the adjacent ends of said mainshafts lateral crankpins projecting from each said arm and attached to a common central crankpin having an axial centerline parallel with said lateral crankpins but whose axial center is displaced from that of said lateral crankpins, lateral connecting rods rotatively mounted on said lateral crankpins at one end and pivotally attached to a central connecting rod at the other end said central connecting rod having a journal at one end for pivotally mounting a piston and being rotatively attached to a link at the other end, said link being rotatively mounted on said common central crankpin.

2. A crankshaft comprising a plurality of longitudinally aligned and longitudinally spaced mainshafts having arms fixed on the adjacent ends of said mainshafts lateral crankpins projecting from each arm and attached to a common central crankpin having an axial center parallel with said lateral crankpins but whose axial center is displaced from that of said lateral crankpins, lateral connecting rods rotatively mounted on said lateral crankpins at one end and pivotally attached to a central connecting rod at the other end said central connecting rod having a journal at one end for pivotally mounting a piston and a larger journal at the other end for rotatively mounting on an eccentric said eccentric being rotatively mounted on said common central crankpin.

* * * * *